United States Patent [19]
Koestler

[11] Patent Number: 6,043,620
[45] Date of Patent: Mar. 28, 2000

[54] METHOD FOR MOVING A POWER-OPERATED CLOSURE PART

[75] Inventor: Werner Koestler, Vienna, Austria

[73] Assignee: Siemens Aktiengesellschaft, Munich, Germany

[21] Appl. No.: 09/273,732

[22] Filed: Mar. 22, 1999

Related U.S. Application Data

[63] Continuation of application No. PCT/DE97/02079, Sep. 16, 1997.

[30] Foreign Application Priority Data

Sep. 21, 1996 [DE] Germany .......................... 196 38 781

[51] Int. Cl.$^7$ ..................................................... H02P 1/00
[52] U.S. Cl. .......................... 318/282; 318/266; 318/286
[58] Field of Search ............................. 361/181; 318/266, 318/286, 466, 282; 49/28, 25, 26

[56] References Cited

U.S. PATENT DOCUMENTS

| | | | |
|---|---|---|---|
| 4,351,016 | 9/1982 | Felbinger | 361/181 |
| 5,334,876 | 8/1994 | Washeleski et al. | 307/10.1 |
| 5,428,923 | 7/1995 | Waggamon | 49/28 |
| 5,537,013 | 7/1996 | Toyozumi et al. | 318/283 |
| 5,734,245 | 3/1998 | Terashima et al. | 318/453 |

FOREIGN PATENT DOCUMENTS

| | | |
|---|---|---|
| 3303590A1 | 8/1984 | Germany . |
| 3136746C2 | 4/1988 | Germany . |
| 8903714 | 3/1990 | Germany . |
| 4339365C1 | 5/1995 | Germany . |
| 19514954A1 | 12/1995 | Germany . |

*Primary Examiner*—Bentsu Ro
*Assistant Examiner*—Rita Leykin
*Attorney, Agent, or Firm*—Sughrue, Mion, Zinn, Macpeak & Seas, PLLC

[57] ABSTRACT

A limiting value (G1; G2) of the speed (n) or of the duration of rotation (t) of an actuator drive shaft is used to provide effective protection against a closing part pinning an obstruction, by either switching off or reversing the actuator drive of the closing part. This limiting value (G1; G2) is defined from the speed (n) or duration of rotation (t) determined for each position of the travel path (h), and from a multiplier which represents the relative sluggishness (S1/S2) of the respective actuator in the respective position along the travel path. The limiting value (G1; G2) is updated in conformance with actual operation of the actuator drive.

18 Claims, 2 Drawing Sheets

METHOD FOR MOVING A POWER-OPERATED CLOSURE PART

This is a Continuation of International Application PCT/DE97/02079, with an international filing date of Sep. 16, 1997, the disclosure of which is incorporated into this application by reference.

FIELD OF AND BACKGROUND OF THE INVENTION

The invention relates to new and useful improvements in an actuator. More particularly, the invention relates to an electric motor geared drive for moving power-operated closure and a method for moving the closure parts.

Actuators of the aforementioned type are used, in particular, as drives for window lifters, sliding roofs or partitions, e.g., in motor vehicles. They contain an electric motor, in particular a commutator motor, whose rotor shaft meshes as a transmission shaft with a worm wheel which drives the respective closure part. An electric motor geared actuator for a window in a motor vehicle is disclosed, for example, in German Utility Model 89 03 714.

There are ever more stringent regulations to be observed in providing an effective protection against being caught between a window or sliding roof closed by motor power and an obstacle against which the window or roof comes to bear. These regulations require, inter alia, the closing operation to be broken off and/or stipulate that the window, the partition or the roof subsystem be driven to move in a reverse direction before it exerts a force of 100 Newtons or more on a semirigid, cylindrical rod with a diameter of 4 mm to 200 mm. The rod has a specific measure of deflection under force and is inserted as an obstacle through the opening of the window, partition or roof subsystem at an arbitrary point.

German Laid-Open Publication 33 03 590 A1 discloses an electric window lifter drive for automobiles or similar motor vehicles which has a safety circuit for protection against pinning an obstruction. The lifter has an electronic active-power meter for continuously measuring the power consumption of the drive motor. A power/travel path diagram is stored in a program memory and assigned a power tolerance limit in such a way that the current is interrupted, or its direction is reversed at the driving electric motor when a power occurs which overshoots the prescribed tolerance limit. To prevent the safety circuit from undesirably responding when, for example, the window driven by a motor vehicle window lifter runs onto the upper edge of the window frame, thereby causing a rise in motor power, there is either a need for a special switch which switches off the safety circuit when this position is reached, or the last stretch of path determined by a pulse generator is prescribed such a high tolerance limit that the safety circuit can no longer respond.

German Patent 31 36 746 C2 discloses a method for electronically monitoring the opening and closing operation of window lifters and sliding roofs in motor vehicles. In the method, the entire travel path is subdivided into three regions. In the first and third regions, the actuator switches off when a temporal limiting value is reached in the blocking state. In the second region, measured values of the speed or linear velocity of the actuator are continuously collected and compared with a limiting value that is tied to the initial measured value in the first region. When the limiting value is overshot, this causes the actuator to be switched off or reversed.

German Laid-Open Publication 195 14 954 A1 discloses an actuator for moving a motor vehicle window in which the closing force is limited when the window runs onto an obstacle. This limitation is implemented by detecting the motor current and the travel path of the window. When adaptive limiting values are reached, the drive is switched off or reversed. The limiting values are defined in such a way that a specific motor current is stored for each position of the window.

OBJECT OF THE INVENTION

One object of the invention is to provide an improved method for moving power-operated closure parts. Another object is to provide such a method, which can be implemented without substantial changes or additions in associated hardware relative to the conventional art.

SUMMARY OF THE INVENTION

These and other objects are achieved by a method in accordance with the invention for moving a power-operated closure part over a travel path (h) with an actuator including a drive shaft for the closure part. This method includes:

defining a limiting value (G1; G2) of a predetermined rotational parameter (e.g. n; t) of the drive shaft as a profile based on a respective drive energy of the actuator for each position of the travel path (h) and a stored kinetic resistance of the actuator for each position of the travel path (h);

generating an associated drive energy profile of the actuator by measuring an actual drive energy (M1; M2) of the actuator for each position of the travel path (h);

generating a tolerance band limit (T1, T2) that envelops the associated drive energy profile but does not cross the profile of the limiting value with respect to the predetermined rotational parameter; and whenever a current drive energy (M1) of the actuator overshoots the tolerance band limit (T1, T2) without crossing the limiting value, adjusting the tolerance band limit to envelop the current drive energy;

adjusting the profile of the limiting value (G1; G2) in accordance with the adjusted tolerance band limit, to provide an updated profile of the limiting value; and initiating a closing force limitation whenever the current drive energy of the actuator crosses the limiting value of the predetermined rotational parameter.

In accordance with the present invention, it is possible to create an actuator for protection against pinning an obstruction which, by contrast with the prior art, operates with less outlay on control and measurement and does not unnecessarily slow down the closing time (speed) of the closure part, because it can be adapted to the individual structural and operating conditions of the actuator. An actuator operated in accordance with the invention requires only one measuring element in the form of a speed-dependent displacement sensor.

According to the method, the limiting value of the speed or duration of rotation (either of which is decisive for limiting the closing force) of a drive shaft of the actuator is modifiable with respect to its spacing from a respective instantaneous measured value of the speed or rotation. This is done by taking into account the drive energy measured for the respective drive for each position of the travel path and of the sluggishness of the actuator stored as a function of the travel path. Additionally, according to the method, the profile of the limiting value G1=f(h); G2=f'(h) is updated, particularly by adapting it to age-induced changes in the closing system over the travel path of the closing part. The updating is done such that the associated profile of the drive energy respectively currently measured is bracketed over the travel path by a tolerance band situated entirely on one side of the profile of the limiting value. Then, the tolerance band is repositioned during operation such that an actual measured value of the drive energy is kept inside the tolerance band when a tolerance limit is overshot, so long as the limiting value is not reached. If the limiting value is reached, the closing system determines this to be the result of an obstruction, and thus initiates a closing force limitation, e.g. by stopping or reversing the closure part.

It is expedient for this purpose to define the limiting value on the basis of a sluggishness multiplier which takes account of the relative sluggishness S1/S2 of the actuator as a function of the travel path. In this case, S1 represents the sluggishness value determined for each actuator for each position of the travel path, and S2 represents a constant sluggishness value fixed for each actuator based on the actuator type (model).

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
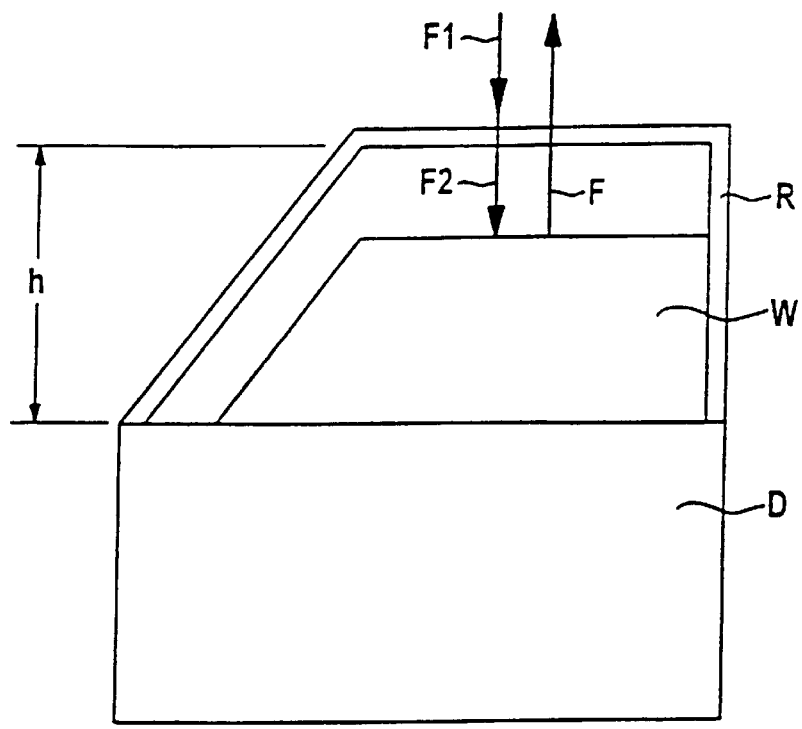
FIG. 1 shows a diagram of the design of a window lifter drive in a motor vehicle, including the forces acting as the window moves.

FIG. 1 shows a motor vehicle door D with a window pane W which can be moved up and down over a travel path h in a window frame R of the door between an "open" position and a "closed" position. In the equilibrium of forces represented, the total driving force F for moving the window W is represented over the travel path h thereof. The total driving force F of the actuator, in particular its electric motor, follows from the friction force F1 to be overcome, which is determined by the sluggishness, and the permissible closing force F2.

Figure 2:
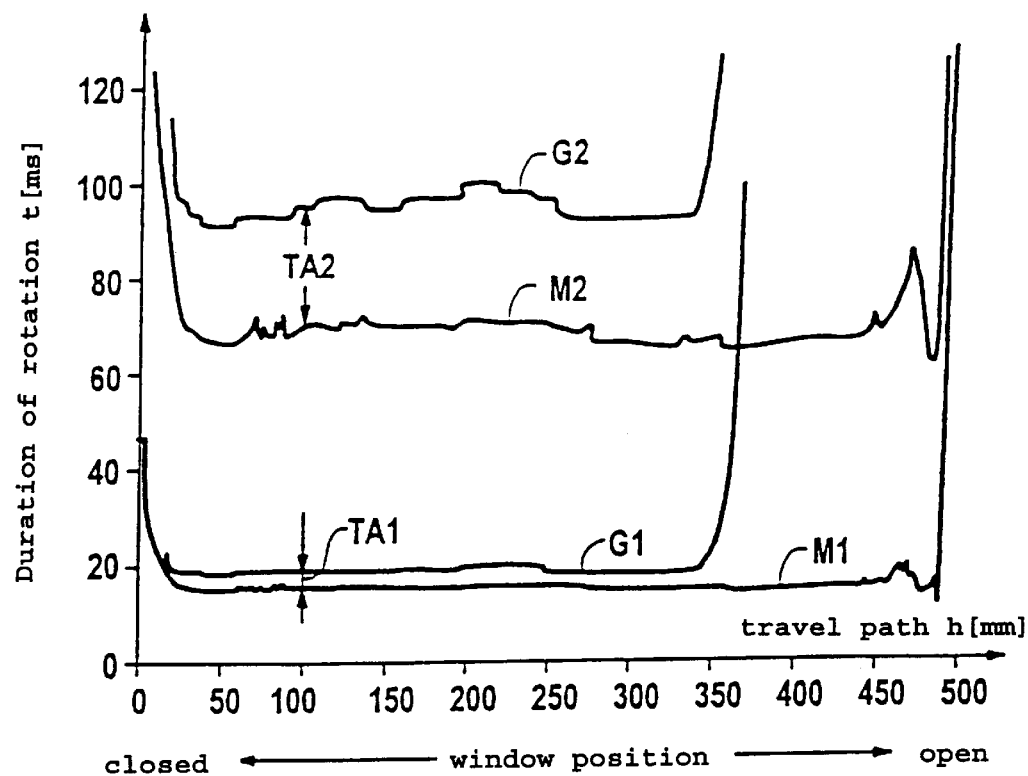
FIG. 2 shows functional profiles of the duration of rotation of a drive shaft as a function of the travel path of the window both as a current measurement result and as a limiting value derived therefrom by taking account of the respective drive energy and the relative sluggishness, for both a first illustrative case in which the window moves with ease and a second illustrative case in which the window moves sluggishly.

FIG. 2 shows the functional dependence of the duration of rotation of a drive shaft of the actuator, in particular of the electric motor, on the respective travel path h, i.e., the respective window position between "open" on the one hand, and "closed" on the other hand. The diagram refers to an example of a movement of a closure part with slight sluggishness, that is to say relatively great ease of movement, in accordance with the functional profile of the respective measured value M1, and to an example with high sluggishness in accordance with the functional profile of the respective measured value M2.

The respective duration of rotation is expediently obtained by a generally already included displacement sensor, e.g., a tachometer, preferably in the form of a Hall transducer, induced by the rotor of the electric motor, for example by means of a co-rotating magnet wheel. The speed n or duration of rotation t and the feed voltage U, for example of a motor vehicle battery driving the window lifter drive, are measured in this manner for each position of the travel path h and can be used in a control unit together with further stored fixed actuator parameters, such as the nominal voltage $U_0$, the idle current $I_0$ and the idling speed no of the electric motor, to determine the speed-dependent power loss P of the motor. This power loss is representative of the drive energy, and is determined in accordance with the following parameters:

$$P = (U - U_{EMK})^2 / R_i$$

$$U_{EMK} = n \cdot K$$

$$K = (U_0 - I_0 R_i) / n_0$$

It is thus possible to determine in a particularly simple way, the power loss, and thus the drive energy of the actuator, starting from a value of the battery voltage in the form of its constant nominal or maximum value. In one embodiment of the invention, a value of the battery voltage U updated during the operating period is used for the purpose of further increasing the sensitivity of the protection provided by the invention against pinning an obstruction.

Figure 3:
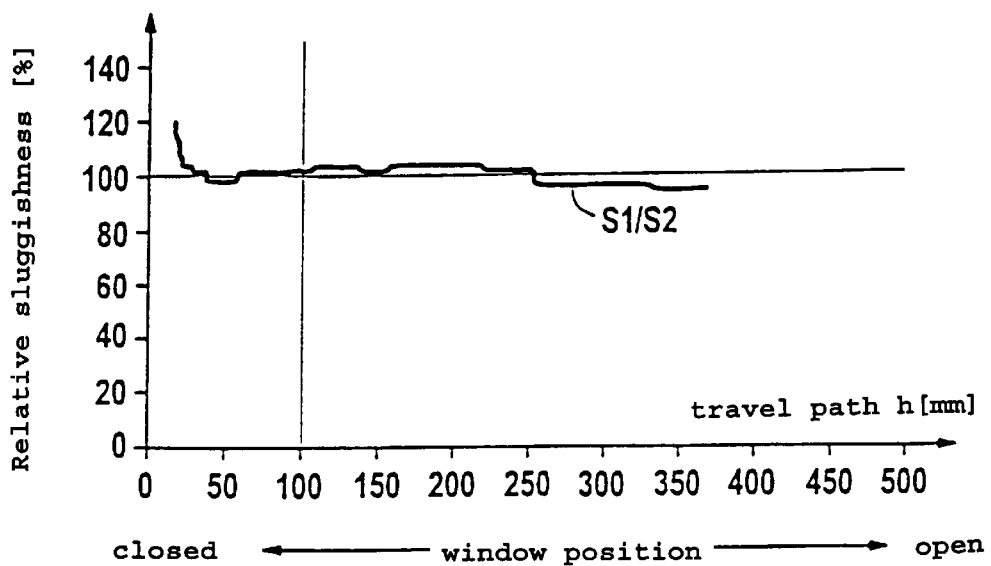
FIG. 3 shows the functional profile of a stored measurement of the relative sluggishness of a window.

The profiles of the limiting values G1 and G2 for which the actuator is preferably switched off or reversed to ensure protection against pinning an obstruction are derived from the functional profiles of the current measured values M1 and M2 while taking account of the reduction in the measured drive energy. This reduction both conforms to the maximum permissible closing force and takes into consideration the relative sluggishness S1/S2 of the actuator, which is stored in memory and is represented in FIG. 3 with respect to its functional profile. S1 represents the sluggishness value determined for each actuator for each position of the travel path h, and S2 represents a constant sluggishness value fixed for each type of actuator. The functional profile of the relative sluggishness is expediently determined and stored in a control device on the occasion of the original installation of the actuator. The actuator, for example, is installed in the door of a motor vehicle.

The component of the kinetic energy resulting as a function of the differing duration of rotation in the closing system, which would otherwise cause an undesired or impermissible rise in the closing force acting on an object pinned by the closing part, must be eliminated for systems, such as this, that provide protection against pinning. Consequently, in the case where the closing part moves easily, i.e., where there is a rapid closing operation with high stored kinetic energy, the limiting value G1 is relatively close to the respective current measured value M1. On the other hand, there exists a greater separation between the respective measured value M2 and the limiting value G2, which corresponds to a part that closes more sluggishly, i.e., where this is a slow closure with low stored kinetic energy. As may be seen from the position of the travel path of h=100 mm set forth in the functional profiles in accordance with FIGS. 2, 3, a limiting value G1 or G2 is advantageously set with a buffer relative to the associated measured value M1 or M2.

The limiting value G1; G2 is preferably individually adapted for each actuator in relation to the associated measured value M1 and M2 in accordance with the different tolerance spacings TA1 and TA2. The limiting values are also a function of the respective measured drive energy and the individual sluggishness of the actuator. Like the current measured values M1; M2, the limiting values G1; G2 are functions of the travel path h:

$$G1=f(h);$$

$$G2=f'(h).$$

According to the invention, the profile of the limiting value G1; G2 is updated in order to account for age-induced changes in the behavior of the closing system in the course of traversing a travel path h. These changes can arise, for example, because of differing wear of a sealing guide, which acts as a hindrance to the motor vehicle window to various degrees over the travel path h of the motor vehicle window.

Figure 4:
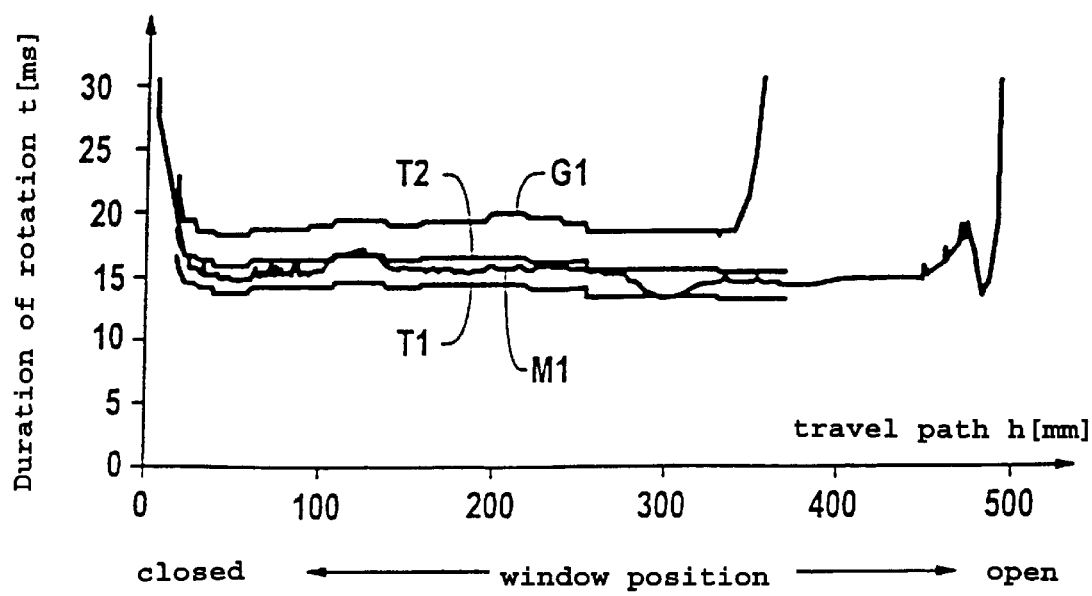
FIG. 4 shows an updating of the limiting value in the case of overshooting of tolerance limits of a tolerance band enclosing the profile of said value.

As explained with reference to FIG. 4 with regard to the limiting value G1, first, the profile of the currently measured value M1 of the duration of rotation with respect to the travel path h is enclosed by tolerance band limits T1 and T2. These tolerance band limits T1 and T2 are situated below the profile of the limiting value G1 in FIG. 4 and include a lower tolerance band limit T1 and an upper tolerance band limit T2. Second, in case of the measured value M1 overshoots a tolerance band limit T1 or T2 but fails to reach the limiting value G1 or G2, then the tolerance band limits T1 and T2 along with the limiting value G1 are adjusted, preferably in tandem, such that the measured value M1 again lies just within the tolerance band. Preferably, the adjustment is limited essentially to the position along the travel path h where the overshoot occurred. The value of the change as a result of the adjustment should be only very small. The profile of the tolerance band limits T1 and T2 is stored in such a way that it corresponds essentially to the profile of the associated limiting value G1, taking into account the feed voltage of the electric motor of the actuator present at the start of the tolerance band when the closing part makes an opening movement.

As such, over the course of operation of the motor vehicle window, the tolerance band limits T1, T2 and the limiting value G1 will be adjusted up or down in conformance with the actual operating conditions. This ensures that the actuator is always well-calibrated, and avoids both an incorrect actuation of the closing force limitation due to aging of the components, and a decline in the mandated sensitivity of the closing force limitation.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A method for moving a power-operated closure part over a travel path with an actuator including a drive shaft for the closure part, said method comprising:

defining a limiting value of a predetermined rotational parameter of the drive shaft as a profile based on a respective drive energy of the actuator for each position of the travel path and a stored kinetic resistance of the actuator for each position of the travel path;

generating an associated drive energy profile of the actuator by measuring an actual drive energy of the actuator for each position of the travel path;

generating a tolerance band limit that envelops the associated drive energy profile but does not cross the profile of the limiting value with respect to the predetermined rotational parameter; and whenever a current drive energy of the actuator overshoots the tolerance band limit without crossing the limiting value, adjusting the tolerance band limit to envelop the current drive energy;

adjusting the profile of the limiting value in accordance with the adjusted tolerance band limit, to provide an updated profile of the limiting value; and initiating a closing force limitation whenever the current drive energy of the actuator crosses the limiting value of the predetermined rotational parameter.

2. The method according to claim 1, wherein the predetermined rotational parameter is a speed of rotation of the drive shaft.

3. The method according to claim 1, wherein the predetermined rotational parameter is a duration of rotation of the drive shaft.

4. The method according to claim 1, wherein, in said step of adjusting the tolerance band limit, the tolerance band limit is adjusted such that the currently measured drive energy lies just inside the adjusted tolerance band limit.

5. The method according to claim 1, wherein the closing force limitation causes the actuator to stop moving the closure part.

6. The method according to claim 1, wherein the closing force limitation causes the actuator to reverse a direction of moving the closure part.

7. The method according to claim 1, wherein the limiting value is a profile based on a kinetic resistance multiplier which takes account of a respective relative sluggishness S1/S2 of the actuator, where S1 represents a sluggishness value determined for each actuator for each position of the travel path, and S2 represents a predetermined, constant sluggishness value fixed for the actuator according to its type.

8. The method according to claim 1, wherein:

the actuator further includes an electric motor; and the respective drive energy is a function of a power loss produced operationally at a winding impedance of the electric motor of the actuator.

9. The method according to claim 8, wherein the respective drive energy is determined by means of a respective motor speed and a feed voltage of the electric motor.

10. The method according to claim 8, wherein the respective drive energy is determined by means of a duration of rotation of the drive shaft and a feed voltage of the electric motor.

11. The method according to claim 9, wherein the power loss P is determined from the winding impedance $R_i$ of the electric motor and the feed voltage U of the electric motor, taking account of a generator voltage $U_{EMK}$, which is induced on the motor winding and assumed to have no losses, of the electric motor in accordance with:

$$P=(U-U_{EMK})^2/R_i$$

where $U_{EMK}=n \cdot K,$ n denotes the respective motor speed, and

K denotes a motor constant, which is determined in accordance with a relationship:

$$K=(U_0-I_0R_i)/n_0$$

where $U_0$ denotes a nominal voltage of the electric motor, $I_0$ denotes an idle current of the electric motor, and $n_0$ denotes an idling speed of the electric motor.

12. The method according to claim 10, wherein the power loss P is determined from the winding impedance $R_i$ of the electric motor and the feed voltage U of the electric motor, taking account of a generator voltage $U_{EMK}$, which is induced on the motor winding and assumed to have no losses, of the electric motor in accordance with:

$$P=(U-U_{EMK})^2/R_i$$

where $U_{EMK}=n \cdot K$, n denotes the respective motor speed, and

K denotes a motor constant, which is determined in accordance with a relationship:

$$K=(U_0-I_0Ri)/n_0$$

where $U_0$ denotes a nominal voltage of the electric motor, $I_0$ denotes an idle current of the electric motor, and $n_0$ denotes an idling speed of the electric motor.

13. The method according to claim 1, wherein the predetermined rotational parameter of the drive shaft is determined by means of at least one travel path sensor.

14. The method according to claim 13, wherein the travel path sensor is a speed sensor.

15. The method according to claim 9, wherein the feed voltage is a currently measured value of the feed voltage.

16. The method according to claim 10, wherein the feed voltage is a currently measured value of the feed voltage.

17. The method according to claim 15, wherein the currently measured value of the feed voltage is a motor vehicle battery voltage.

18. The method according to claim 16, wherein the currently measured value of the feed voltage is a motor vehicle battery voltage.

* * * * *